United States Patent Office 2,855,378
Patented Oct. 7, 1958

2,855,378

A METHYLPHENYLSILOXANE COMPOSITION CONTAINING AN OXIDE OF MORE THAN DIVALENT LEAD

Orville A. Braley, Midland, Mich., assignor to Dow Corning Corporation, Midland, Mich., a corporation of Michigan No Drawing. Application November 8, 1954
Serial No. 467,652

1 Claim. (Cl. 260—37)

This invention relates to improved organosiloxane resin molding compositions.

It has long been known that organosilicon resins could be admixed with catalysts and fillers and thereafter formed into molded articles by heat and pressure. The articles so formed have proved to be excellent for electrical insulation and for other uses which require good insulating properties and high heat resistance. One of the difficulties which has been encountered in connection with silicone molding compositions has been the fact that it was necessary to cool the mold substantially to room temperature before opening it. This was due to the fact that the molded article was soft at elevated temperatures and attempts to remove it from the mold while hot would result in deformation or marring of the article. This softening effect could be avoided with prolonged curing in the mold. However, this remedy resulted in a prolonged molding cycle and hence greatly increased the cost of silicone molded articles.

It is an object of this invention to provide a silicone molding composition which can be cured to a tack-free state in a matter of a few minutes whereby it can be pulled from the mold hot. Another object is to provide silicone molded articles having improved flexural and impact strength over those previously available. Another object is to substantially reduce the cost of silicone molded articles by making possible more rapid fabrication. Other objects and advantages will be apparent from the following description.

Prior to this invention it was known from U. S. Patent No. 2,410,737 that lead oxide, i. e., PbO, was a catalyst for the setting of silicone resins. However, before this invention the art taught that higher oxides of lead were useless for such a purpose. It is quite unexpected, therefore, to discover that when the higher oxides of lead are employed in conjunction with other catalysts that superior strengths are obtained from molded silicone articles.

This invention relates to heat hardenable compositions of matter consisting essentially of a phenyl lower alkyl siloxane resin, from .5 to 18% by weight based on the weight of the resin of an oxide of lead wherein the lead has a valence above 2 and a curing catalyst for siloxane resins.

The siloxane resins which are operative in this invention are those which contain both phenyl and lower alkyl radicals having less than 3 carbon atoms. Thus the resins comprise copolymers of monophenylsiloxane, diphenylsiloxane, phenylmethylsiloxane, phenylethylsiloxane, monomethylsiloxane, dimethylsiloxane, ethylmethylsiloxane, monoethylsiloxane and diethylsiloxane. The total number of phenyl and alkyl radicals should be between 1 and 1.7 per silicon atom.

The lead oxides which are operative in this invention are $Pb_3O_4$, $Pb_2O_3$ and lead dioxide. The improvements of this invention are not obtained with PbO. The lead oxide should be present in amount from .5 to 18% by weight based on the weight of the resin. When the amount of lead is above 18%, inferior products are obtained.

In order to obtain satisfactory molding with the compositions of this invention siloxane curing catalyst must be employed in addition to the lead oxide. Suitable catalysts include salts of carboxylic acids such as lead octoate, tin-2-ethylhexoate, dibutyl-tin-diacetate, dibutyl-tin-dilaurate, tributyl-tin-2-ethylhexoate, cobalt naphthenate, zinc naphthenate, and iron octoate; alkali metal hydroxides; alkali metal salts of organosilanols; amines such as triethanol amine and diethanol amine; quaternary ammonium hydroxides such as tetramethyl ammonium hydroxide; quaternary ammonium salts such as beta-hydroxyethyltrimethyl ammonium butoxide, trimethyl ammonium 2-ethylhexoate and benzyltrimethyl ammonium bicarbonate.

If desired, the composition of this invention may also contain fillers in order to improve physical properties or to modify a specific property. Suitable fillers include metal oxides such as iron oxide, titania and magnesium oxide and siliceous fillers such as glass, diatomaceous earth, crushed quartz, expanded clays and the like.

In order to mold the compositions of this invention the resin is best liquified and mixed with the lead oxide, catalyst and any desired filler. The mixing of the lead oxide, filler, catalyst and resin can be accomplished in any desired manner. One expeditious way for doing this, particularly where continuous fiber fillers such as glass fibers are employed, is as follows: The fiber is pulled from a roll through a heat-cleaning column which is heated from 400° C. to 600° C. preferably about 500° C. to remove any extraneous organic matter from the fiber surface. The fibers are then passed through a dipping tank containing a dilute solution, i. e., 1 to 10% by weight, preferably about 5%, of phenyl lower alkyl organopolysiloxane resin containing a curing catalyst. The impregnated fiber is then passed through a drying column which is heated in the neighborhood of 50° C. to remove solvent and then through a curing column where the resin is cured at a temperature of from 400° C. to 600° C. preferably about 500° C. This initial coating of resin is applied to the fibers as a sizing in order to increase the adhesion of subsequent resin coatings. The fiber containing the cured siloxane resin is then passed through a second dipping tank which contains a solution of the compositions of this invention, i. e., the resin, lead oxide, catalysts and any desired additional filler. From this dipping tank the fibers are passed through a drying tower which is maintained from 80°–100° C. to remove solvent and thence through a precuring column which is maintained in the neighborhood of 100° C. In this latter column the resin coating is partially cured to a tack-free state. The fibers are then passed between rolls preferably of a heat resistant rubber. These rolls serve to pull the fiber through the entire operation. The fibers are pulled through the towers at any desired speed. In general, speeds of from 3 to 25 ft. per minute are suitable. With the lower speeds lower curing temperatures are used while with higher speed higher temperatures are used. The strands which emerge from the rolls may then be cut into suitable lengths and thereafter employed as a molding composition.

The mixtures prepared as shown above are best molded at pressures above 500 p. s. i. at temperatures from 150–250° C. Under these conditions the resin will cure to a tack-free state in a matter of 10–15 minutes and can thereupon be pulled from the mold without cooling. If desired, the molded article can be cured further by heating in an oven at temperatures from 150 to 250° C. This after bake is desirable where the molded article is to be subjected to a full load immediately upon use at elevated temperatures.

The products of this invention possess superior flexural strength and impact strength over previously known silicone molding compositions.

The following examples are illustrative only and are not to be construed as limiting the invention which is properly set forth in the appended claim.

Example 1

The siloxane resin employed in this example had the following composition: 29.4 mol percent phenylmethylsiloxane, 32 mol percent monomethylsiloxane, 32.6 mol percent monophenylsiloxane and 6 mol percent diphenylsiloxane and contained, based on the weight of the resin, .15% β-hydroxyethyltrimethylammonium 2-ethylhexoate, .25% dibutyl-tin-di-2-ethylhexoate and .05% lead 2-ethylhexoate. This resin was compounded into compositions containing 35% by weight of the resin, 45% by weight glass roving, 14% by weight diatomaceous earth, 4% by weight ferric oxide, 1% by weight calcium stearate and 1% by weight of one of the lead oxides shown below. Each sample was then heated in a press at 175° C. for 15 minutes at a pressure of 4,000 p. s. i. The resulting samples were then tested for flexural strength at 30° C. and the results are shown in the table below.

| Sample | Oxide | Flexural Strength in p. s. i. |
|---|---|---|
| 1 | PbO | 4,900 |
| 2 | Pb$_3$O$_4$ | 7,820 |
| 3 | Pb$_2$O$_3$ | 12,820 |
| 4 | PbO$_2$ | 7,140 |

Samples 2, 3 and 4 could be pulled hot from the mold without ill effects.

Example 2

A composition containing 1% by weight Pb$_2$O$_3$ and being identical with that of Example 1 except that the siloxane resin was composed of 29.3 mol percent dimethylsiloxane, 32 mol percent monomethylsiloxane and 38.7 mol percent monophenylsiloxane. This material was molded as shown in Example 1 and the molded product had the following properties at room temperature: flexural strength 20,600 p. s. i., impact strength 28.4 foot pounds per inch and compressive strength 11,200 p. s. i. This sample was pulled hot from the mold without ill effect.

Example 3

The resin employed in this example had a composition of 33⅓ mol percent monoethylsiloxane, 33⅓ mol percent monomethylsiloxane and 33⅓ mol percent monophenylsiloxane. This resin contained .45% by weight based on the weight of the resin of β-hydroxyethyltrimethylammonium 2-ethylhexoate.

35% by weight of this resin composition was compounded with 45% by weight glass roving, 14% by weight diatomaceous earth, 4% by weight ferric oxide, 1% by weight calcium stearate and 1% by weight Pb$_3$O$_4$. The composition was heated in a mold for 10 minutes at 175° C. at a pressure of 4,000 p. s. i. The molded bar was pulled hot from the press with no ill effect. The sample had a flexural strength of 33,000 p. s. i. at room temperature.

Example 4

The procedure of Example 3 was repeated except that the resin composition employed was 63 mol percent monomethylsiloxane, 28 mol percent monophenylsiloxane and 6 mol percent diphenylsiloxane which composition contained, .55% by weight β-hydroxyethyltrimethylammonium 2-ethylhexoate. After molding, the flexural strength at room temperature was 39,000 p. s. i.

That which is claimed is:

A heat hardenable composition of matter consisting essentially of a phenylmethylsiloxane resin having per silicon atom an average of from 1 to 1.7 radicals selected from the group consisting of phenyl and methyl radicals, from .5 to 18 percent by weight based on the weight of the siloxane resin of a lead oxide wherein the lead has a valence above two and a curing catalyst selected from the group consisting of salts of carboxylic acids, amines, quaternary ammonium hydroxides, alkali metal hydroxides, alkali metal salts of organosilanols, and quaternary ammonium salts.

References Cited in the file of this patent

UNITED STATES PATENTS

| | | |
|---|---|---|
| 2,258,222 | Rochow | Oct. 7, 1941 |
| 2,410,737 | Jenny | Nov. 5, 1946 |
| 2,495,306 | Zurcher | Jan. 24, 1950 |
| 2,516,047 | DeCoste | July 18, 1950 |
| 2,598,402 | Lucas | May 27, 1952 |